(12) United States Patent
Wiegand

(10) Patent No.: US 6,252,916 B1
(45) Date of Patent: Jun. 26, 2001

(54) DIGITAL FILTER AND MODULATOR

(75) Inventor: Richard J. Wiegand, Millersville, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/132,950

(22) Filed: Aug. 12, 1998

(51) Int. Cl.$^7$ ................................................. H04L 27/12
(52) U.S. Cl. .............................................. 375/302; 708/313
(58) Field of Search ..................................... 375/302, 316, 375/350, 324; 708/300, 313

(56) References Cited

U.S. PATENT DOCUMENTS 5,550,866 * 8/1996 White ..................................... 375/316
5,949,878 * 9/1999 Burdge et al. ........................... 380/9

* cited by examiner

Primary Examiner—Temesghen Ghebretinsae

(57) ABSTRACT

A digital filter and modulator provides programmable distinctive modulation on a programmable frequency selective basis with channelization. The digital channelization processor includes a plurality of channels. Each channel includes a filter and transform circuit that convert a real input signal to a quadrature signal that has a magnitude signal and a phase signal. The quadrature signal is offset and converted back to a real signal that is temporarily held and phase shifted. The digital filter and modulator minimize throughput delay and eliminate analog tolerance and inflexibility problems while eliminating digital processing overflow difficulties.

20 Claims, 5 Drawing Sheets

DIGITAL FILTER AND MODULATOR

BACKGROUND OF THE INVENTION

1. Field of the Invention

The present invention is directed to providing a digital filter and modulator. The invention is further directed to providing cost effective structural and procedural approaches to employ channelization filtering and efficiently applying modulation such that throughput delay can be minimized.

2. Description of Related Art

Now that digital systems are being used in the radio frequency (RF) region, such as, for electronic warfare (EW) applications, a low-power source for all RF signals has been developed known as the coherent digital exciter (CODE) device. One of the most important functions of the CODE device is the ability to apply programmable distinctive modulation on a programmable frequency selective basis throughout the radar band spectrum. The modulation functions include amplitude, phase, frequency (offset), and delay range or time. The programmable frequency selectivity is accomplished with a bank of programmable filters, i.e., channelization. Each received signal passes down one and only one of the channels, allowing distinctive modulation to be applied in each channel.

FIG. 1a shows a generic structure 10 for digital filters. This structure 10 consists of a combination of delay elements 12, adders 14 and multipliers 16. The delay elements 12 are positioned between adders 14. In the generic structure shown, the multipliers 16 form both a feed forward path 18 and a feedback path 20.

In the feed forward path 18, the input signal is delivered to a plurality of multipliers 16, where the input signal is multiplied by a weight. The input signal is also delivered to a delay element 12, and then to an adder 14, which outputs the sum of the weighted signal and the delayed signal.

In the feedback path 20, the output signal is delivered to another plurality of multipliers 16, where the output signal is multiplied by a weight. The weighted output signal is then delivered to an adder 14, which outputs the sum of the weighted signal and the delayed signal.

One common type of digital filter which uses the generic structure shown in FIG. 1a is a finite-impulse-response (FIR) filter, shown in FIG. 1b.

The FIR filter only used the feed forward path 18 shown in FIG. 1a. The delay elements 12 are replaced with a digital tapped delay line 22. This results in a moving average which is non-recursive.

For typical electronic warfare (EW) applications, the FIR filter will be designed with 30 to 40 taps. The FIR filter is programmed, i.e., appropriately and individually adjusting the weights of these taps. This programming involves controlling the three key filter parameters, i.e., the center frequency, the bandwidth, and the shape factor.

However, there appears to be a potential fundamental compatibility problem when used with a digital modulator. Even though the straight through gain requirement is nominally unity, some of the adds of FIG. 1b, prior to the final add, would overflow, thereby giving an "illegal" output. This problem has led to research to develop alternatives when the filter is to be used with such digital modulators, which are the subject of the present application.

There are two difficulties with the FIR digital filter design mentioned above. First, there is great incentive to increase the processing clock rate so that the radar bands can be covered (e.g., by the EW equipment) in as cost effective manner as possible. The FIR digital filter design appears compatible with acceptably significant clock rates, in the order of 200 megahertz to 400 megahertz, when properly integrated with application specific integrated circuits (ASICs).

However, the interfacing digital modulators cannot support such a high clock rate. As one important example, there is a high quality very dense digital memory available, which is needed for the range delay modulation, where a high clock rate is not compatible with its interface or with its efficient use in terms of size per microsecond of memory. The other digital modulating processing circuits have clock rate compatibility problems also.

The second motivation in seeking alternative designs is to reduce cost and size. Although the FIR mentioned above is more economical than the analog circuits it is intended to replace, it is still desirable to reduce the cost and size even more.

SUMMARY OF THE INVENTION

Therefore, it is an object of the present invention to reduce the filter's interface data clock rate to acceptable rates for use with specific digital modulators.

It is further an object of the present invention to reduce the filter cost and size.

It is yet another object of the present invention to eliminate internal overflow difficulties of the FIR design.

It is yet another object of the present invention to apply modulation instantaneously.

It is yet another object of the present invention to optimize the digital filter design in context with the modulator design.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein.

DETAILED DESCRIPTION OF THE PRESENT INVENTION

Figure 1A:
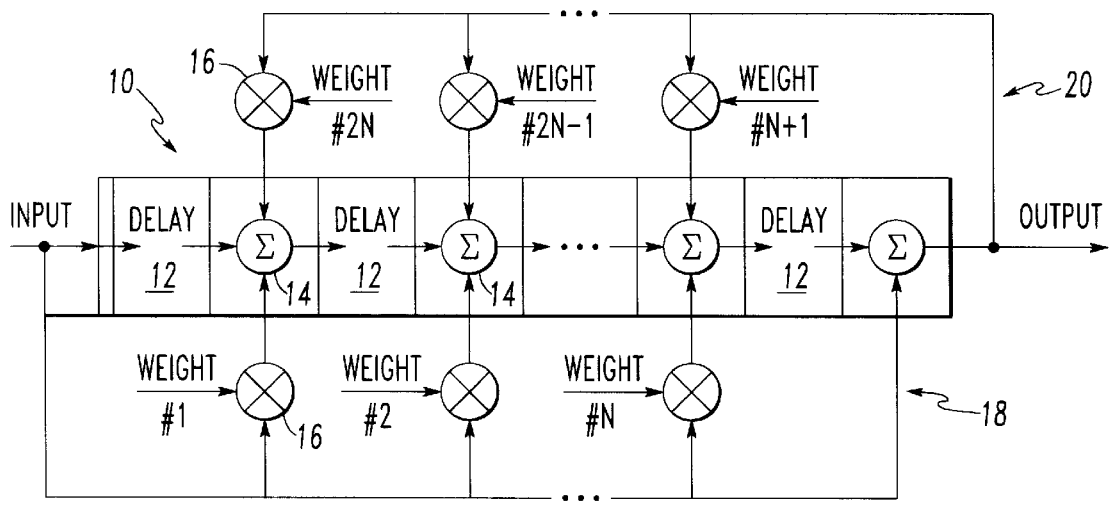
FIG. 1a is a generic digital filter having delay elements, adders and multipliers.
Figure 1B:
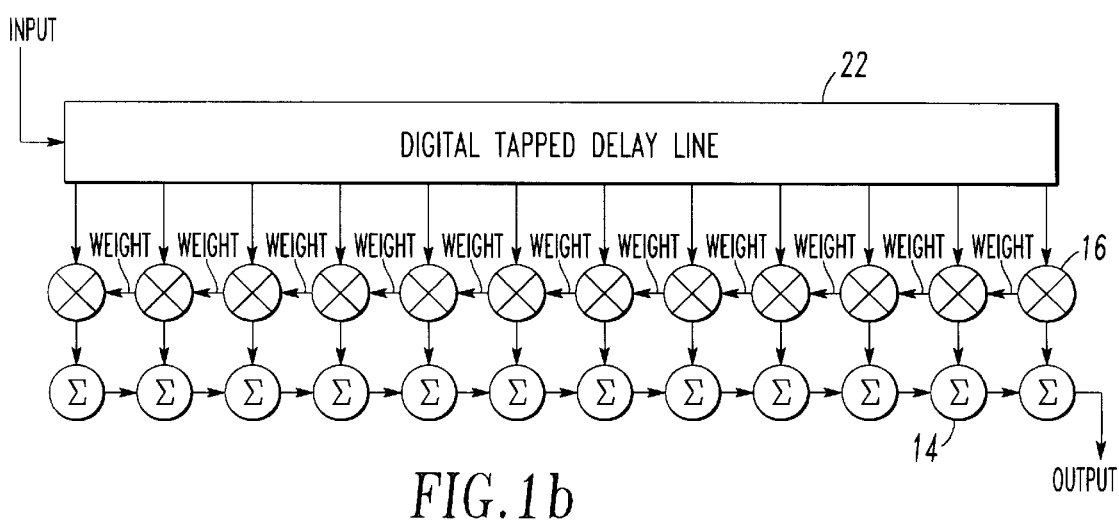
FIG. 1b is a conventional FIR digital filter.

The exemplary embodiments of the invention claimed in the appended claims may be more fully appreciated by reference to the following description. Within the drawing figures, it should be understood that like elements are identified by like reference numbers.

The following approaches attempt to correct this overflow problem disclosed above using channelization processing. An overview of the design options is shown in Table 1.

delta phase to the adder 204, accumulates an even larger value of phase to add or subtract. This continuous change creates a frequency offset. The two components are fed into another Hilbert transform circuit 208 which converts the data stream back into a real signal. Finally, the signal path passes through a random access memory (RAM) 212, or a shift register memory, which, when properly controlled, generates the desired range delay.

The Hilbert transform used above needs to look over a block of time to make its approximation. Therefore, the modulation either cannot be instantaneous or there must be a minimum delay for each transform. The Hilbert transform requires a number of multiples for its functioning, which tends to slow the processing and which requires a significant amount of circuitry.

Another problem with the Hilbert approach arises due to the output of the second Hilbert transform 208 feeding the

TABLE 1

Design Option Identifications
Digital-Channelized-Transponder

Hardware Options

| No. | Abbreviation | Filter DEMUXAmp | Mod | Phase Mod | Delay/Memory | Dec |
|---|---|---|---|---|---|---|
| 1 | FIR-HTM-IM | FIR | HT & multiplier | HT & Adder | Internal RAM | No |
| 2 | FIR-MM-XM | FIR | Mix & multiply | Sin Gen counter | External RAM | Yes |
| 3 | QRC-MM-IM | QRC | Sin Gen RAM | Sin Gen counter | Internal RAM | Yes |
| 4 | QRC-MM-XM | QRC | Sin Gen RAM | Sin Gen counter | External RAM | Yes |
| 5 | QRC-CPT-IM | QRC | Sin Gen RAM | Sin Gen counter | Internal RAM | Yes |
| 6 | QRC-CPT-XM | QRC | Sin Gen RAM | Sin Gen counter | External RAM | Yes |

Digital-Channelized-Receiver

Hardware Options

| No. | Abbreviation | Filter DEMUXDetection | |
|---|---|---|---|
| 1 | FIR-FWRD | FIR | FWRD & thresh |
| 2 | FIR-QMD | FIR | QMD & thresh |
| 3 | QRCD | QRC | quad threshold |
| 4 | AQRCD | SSB Mixer, RC | quad threshold |

Figure 2:
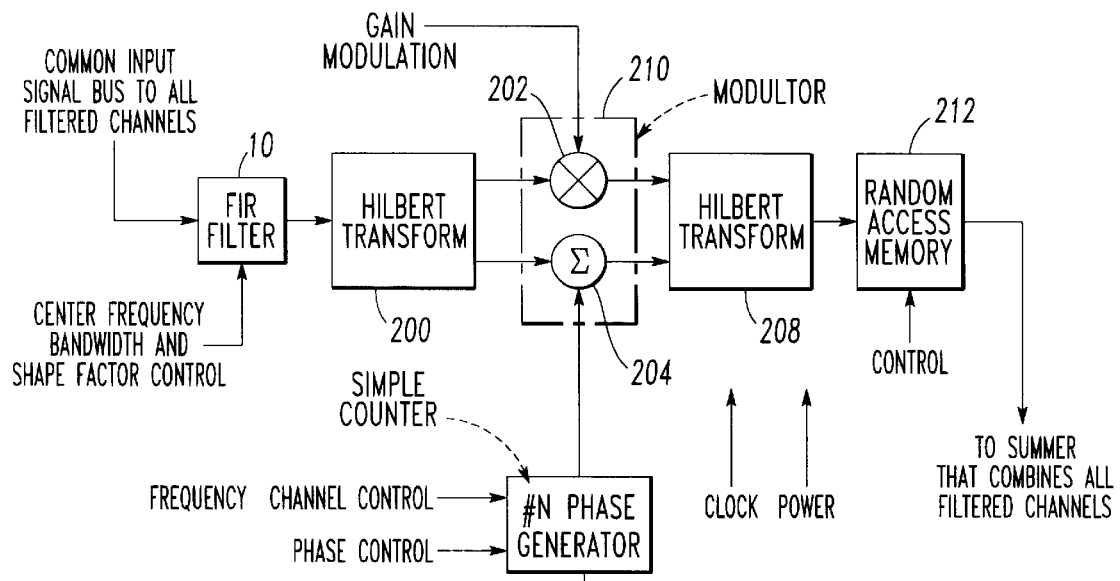
FIG. 2 illustrates a band-pass configuration using channelized processing in accordance with an embodiment of the present application.

The design options for FIG. 2 correspond to digital channelized transponder No. 1 of Table 1. The design options for FIG. 3 correspond to digital channelized transponder No. 2 of Table 1. The design options for FIG. 6 correspond to digital channelized transponder Nos. 3–6 of Table 1.

In all of the designs, an input signal bus to all filtered channels is entered while the output feeds the adder that combines all channels. The input bus has a broad band signal environment. In the following drawing, only one channel of the channelized processing is shown.

FIG. 2 illustrates a version of a channelized processing using a Hilbert transform. The signal passes through a FIR filter 10, then enters a Hilbert transform circuit 200. The Hilbert transform transforms the "real" signal into a quadrature component "imaginary" signal. These components are often referred to as the "I" (magnitude) component and the "Q" (phase) component. The Hilbert transform is needed because it is difficult to phase modulate real signals, but relatively easy to phase modulate imaginary signals.

As shown in FIG. 2, the I and Q components are supplied to a modulator 210 where the magnitude component is multiplied by a multiplier 202 with a gain value while the phase component has a delta phase added or subtracted thereto via an adder 204. To get a frequency offset, instead of just a phase shift, a phase generator 206, providing the RAM 212. The RAM 212 is used to create range delay, directly or indirectly, by temporarily holding the signal. This RAM 212 must operate at the same clock rate as the analog to digital convertor (ADC) and the digital to analog convertor (DAC). The highly efficient RAMS produced by the industry cannot operate at as fast a clock rate as the ADC and DAC clock rates to be used.

Even if that problem can be accommodated by using multiplexers at the RAM input and multiplexers at the RAM output, most of the RAM capacity would still be wasted in terms of holding information. Information theory indicates that the waste factor is equal to the number of channels. For example, if the CODE device had ten channels, the RAM size should be ten times the size needed to hold the information that describes the signals residing in the memory. That is, each channel would need enough memory to describe the entire ADC and DAC limited bandwidth, whereas it only needs to describe a small portion of the input band.

The Decimation Approach

Figure 3:
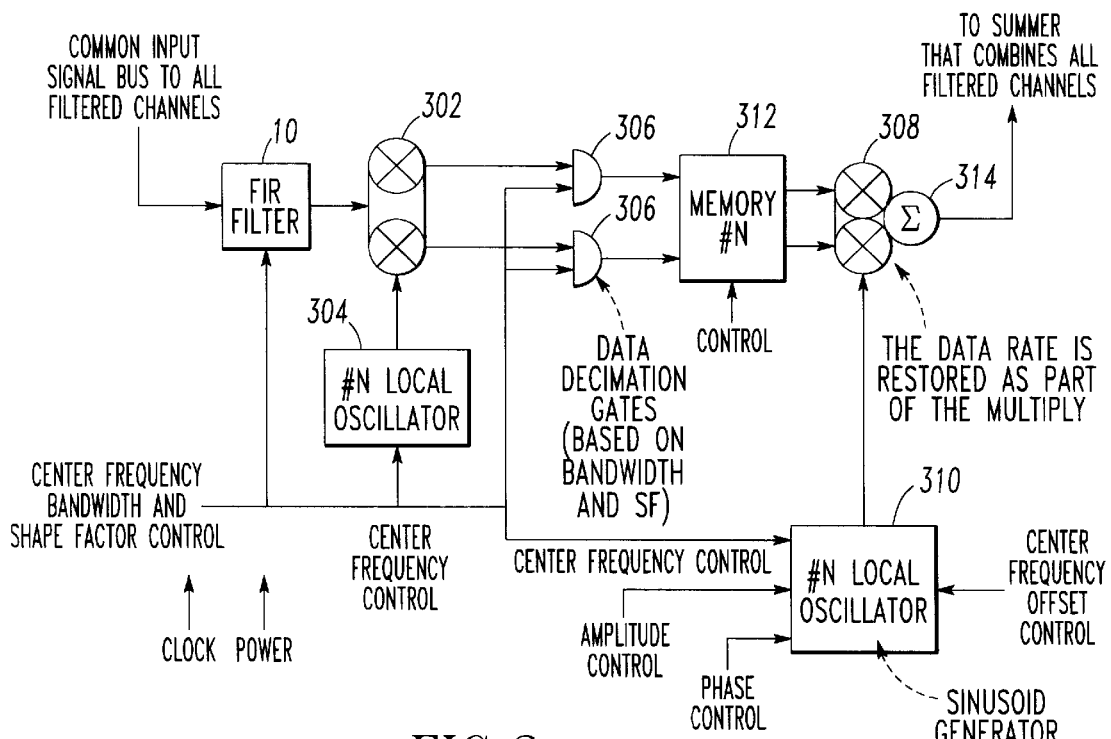
FIG. 3 illustrates a band-pass configuration using multipliers for rate decimation and restoration in accordance with an improved embodiment of the present application.

In accordance with the present invention, FIG. 3 is a further embodiment of a channelized processing approach that provides an improvement over the FIG. 2 approach. As shown in FIG. 3, the clock rate for each channel RAM is reduced to match the programmed bandwidth of each channel's filter, in accordance with information theory particularly Nyquist sampling theory. Specifically, the RAM clock rate for the channel needs to be only twice the bandwidth of the programmable filter in order to pass the in-band signal information with fidelity. However, since the filter skirts are not infinitely steep, it is advisable to make the RAM clock rate twice the acceptable cutoff value bandwidth to keep out-of-band alias terms.

The first Hilbert transform 200 of FIG. 2 is replaced with a local oscillator 304 in FIG. 3 which is modulated to indirectly modulate the input signal with the multiplier 302. The second Hilbert transform 208 of FIG. 2 is likewise replaced with a local oscillator 310 of FIG. 3 which in turn demodulates the signal to return it to its original carrier rate via multiplier 308. The local oscillator signal is known and predictable.

In FIG. 3, the data stream is decimated at gates 306 prior to the RAM 312 and restored subsequent to the RAM 312. The decimation function is done simply with the gates 306 that register the data from a certain and predetermined percentage of equally spaced clock pulses. For example, one clock pulse out of four is passed on or one out of eight, etc.

To validly pass the information content, the clock rate into the RAM 312 must be greater than twice the highest sinusoid component frequency. Therefore, FIG. 3 shows the input being beat down to DC prior to the RAM 312 and restored to the original carrier rate subsequent to the RAM. This is know as homodyne processing.

If a signal band is multiplied by a pure sinusoid, the result will be the spectrum shifted up or shifted down by the frequency of the sinusoid. If it is done twice, then at least one of the components will return to the original frequency. In this case, the second multiply is after the RAM 312 at multiplier 308. The second multiplier 308 is a convenient place to restore the data rate with the result conveniently proving the possibly non-straight line, in between data values, with the local oscillator and the output at the same high clock rate and the input at a lower clock rate.

Using quadrature multiplies (302 and 308) as shown in FIG. 3, the image term may be suppressed. In other words, the processing can distinguish between positive and negative frequencies, since the filter center will be moved to zero.

The intended parameters in use with the configuration shown in FIG. 3 are such that the local oscillator frequency will be made equal to the FIR digital filter programmed center frequency, and the decimation circuit will be programmed to pass a clock rate equal to twice the filter's programmed bandwidth.

In FIG. 3, the double homodyne conversion accomplished with quadrature digital multiplies allows the RAM to be used efficiently. The configuration in FIG. 3 provides other advantages as well.

Figure 4A:
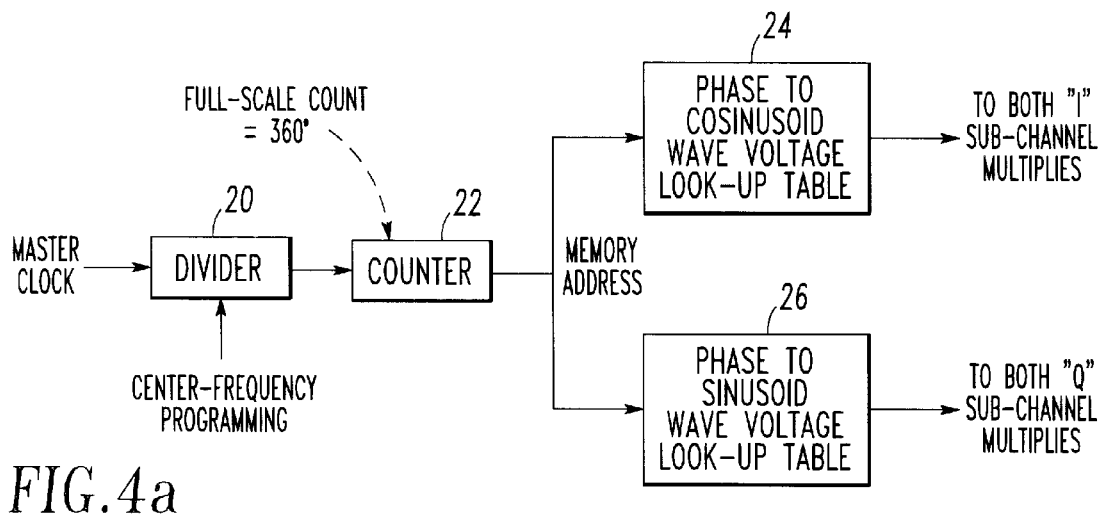
FIGS. 4a–4c show how a quadrature sinusoidal signal can be outputted in real time by look-up tables.
Figure 4B:
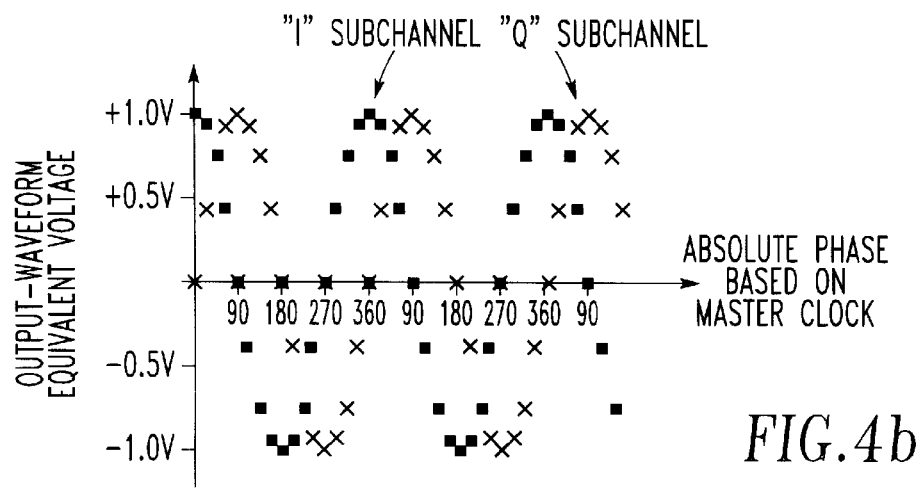
Figure 4C:
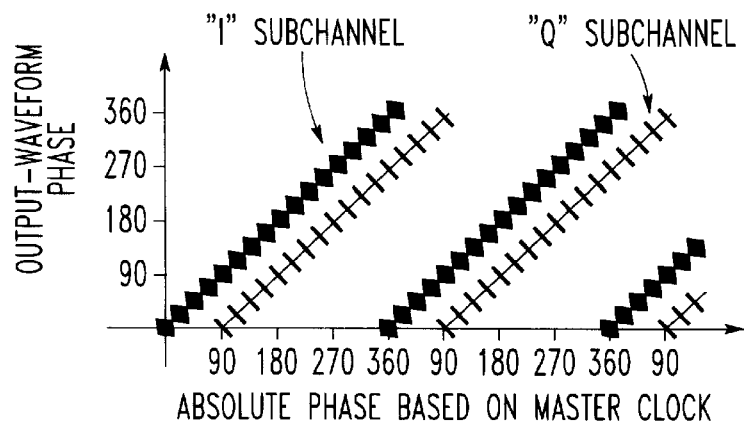

First, the frequency-conversion multiply needs to be in quadrature anyway for homodyne processing purposes. Therefore, the signal has to be converted from scaler to complex. But with a complex-number format the phase/frequency modulation can easily be applied. Therefore, the Hilbert transform circuitry of the previous solution shown in FIG. 2, can be dispensed with. The quadrature sinusoidal signal used to beat against the filtered input from filter 10 can be outputted in real time or it can be generated by a look-up table as shown in FIGS. 4a–4c.

Secondly, the homodyne structure allows modulation to be imposed indirectly via the local oscillator signal instead of being directly applied to the signal path. The local oscillator signal is a known predictable signal. Any processing delay caused by the imposition of modulation to the local oscillator signal is of no consequence for the signal path.

Figure 5:
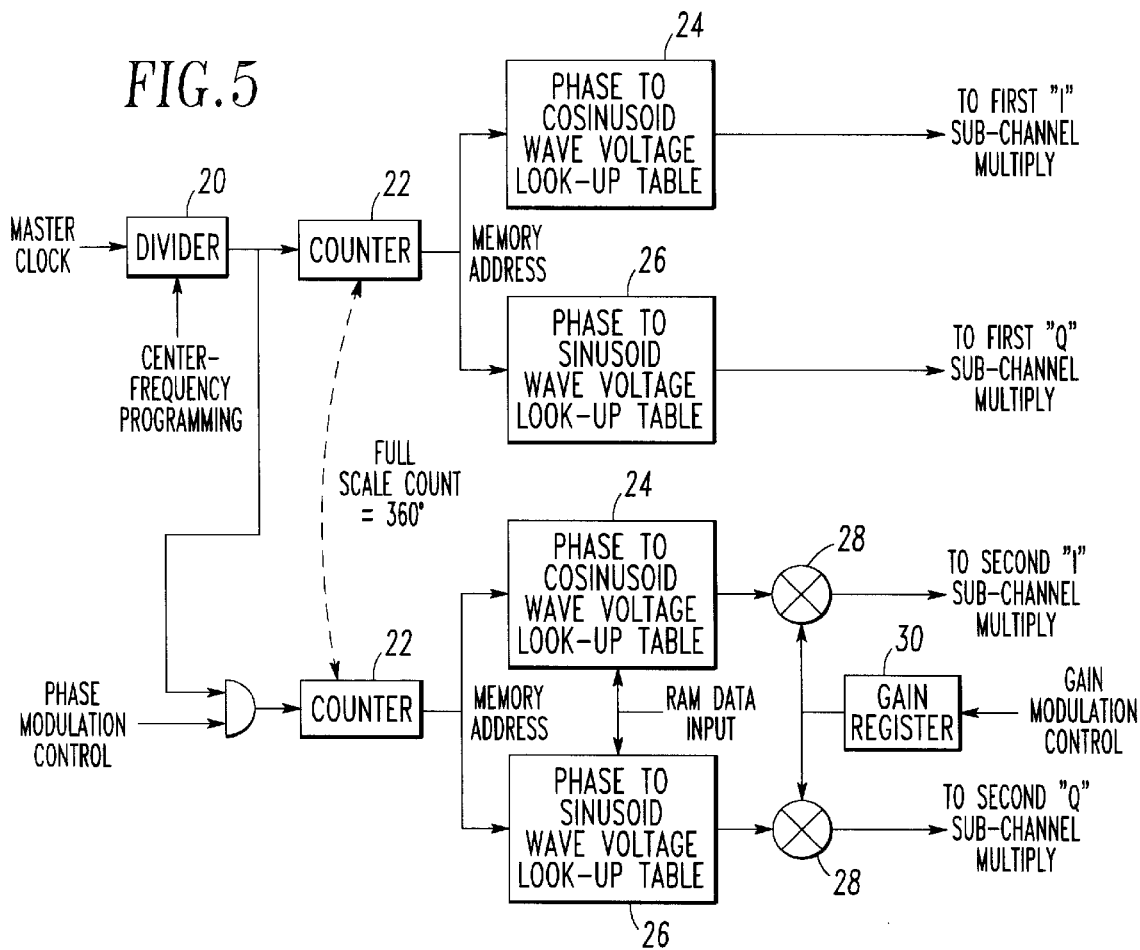
FIG. 5 shows various approaches to impose modulation using look-up tables.

FIG. 5 shows several ways to impose modulation using look up tables. The center-frequency circuitry of FIG. 5 includes a divider 20, counters 22, phase to cosinusoid wave voltage look-up tables 24, phase to sinusoid wave voltage look-up tables 26, multipliers 28 and gain register 30. The phase modulation can be applied by altering the data in one of the RAM look up tables or by offsetting the address counters driving one of the look-up tables. The amplitude modulation can be imposed by altering the data in one or both of the RAM look up tales or by multiplying the output of the RAM look up table by the desired gain value.

The QRC Filter Approach

Figure 6:
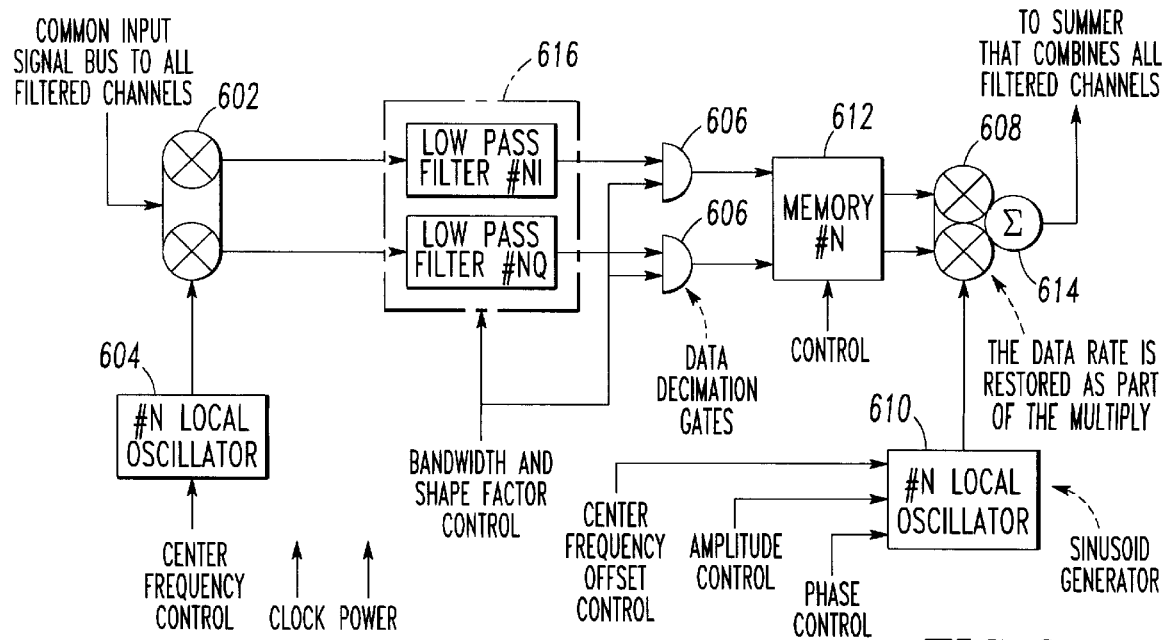
FIG. 6 illustrates a low pass filter configuration using multiplies in the mixer section in accordance with another improved embodiment of the present application.

FIG. 6 shows an alternative configuration of the present invention; it is an improvement over the FIG. 3 approach. While the configuration in FIG. 3 beats the FIR digital signal to output a DC (non-carrier video) so that the data stream can be decimated and efficiently routed through the memory, the configuration shown in FIG. 6 exploits the fact that certain low-pass filter approaches are more efficient than FIR band pass filters. In the structure of FIG. 3 the pass band center is beat to zero. Therefore, there is no reason that the input cannot be converted to zero prior to the filter, and a low pass filter used instead of a band pass, as shown in FIG. 6. Thus, in this configuration, all channel filters have the same center frequency, i.e. zero. The hardware needed to implement a feedback RC type low pass digital filter is much less than needed for the feed forward FIR bandpass digital filter.

Figure 7A:
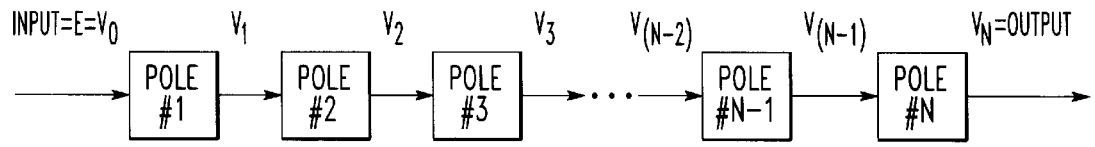
FIGS. 7a–7b illustrate details of the low-pass filter shown in FIG. 6.
Figure 7B:
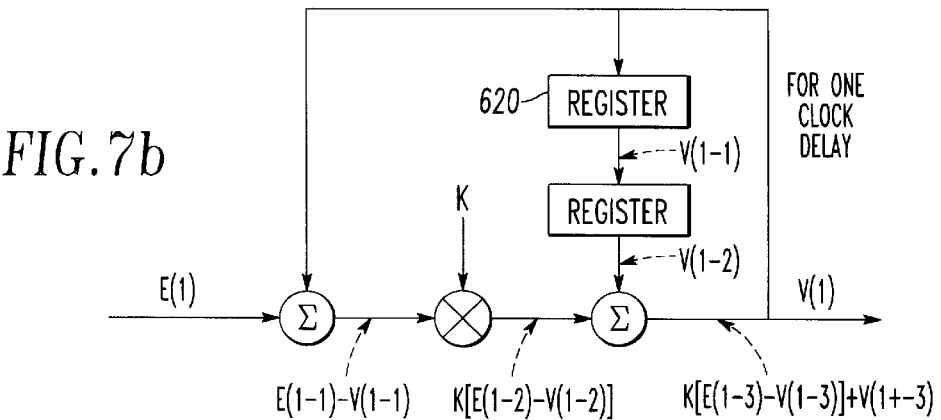

Thus, in FIG. 6, the local oscillators 604, 610 and the multipliers 602 and 608 are used in the same manner as their counterparts in FIG. 3 but prior to a different type of filter, the filters 616. The details of a basic low pass RC filter 616 is shown in FIGS. 7a and 7b. The filter is a series of identical stages or poles 618 and there is no difficulty with interim result overflow. A FIR filter center bandwidth and shape factor are determined by the selection of the coefficient and the selection of the number of taps. The filter described here has its center set by the local oscillator frequency as shown in FIG. 6, its bandwidth set by the control parameter "K" shown in FIG. 7b and its shape factor or skirt steepness set by the number of series stages or poles 618 shown in FIG. 7a.

Computer simulations indicate that a five pole feedback filter has a shape factor or skirt steepness equivalent to a thirty-one tap FIR feed forward filter. Further, as shown at Table 2 below, the low pass filters used much less hardware (17%) than the FIR digital filter to perform equivalent filter operations.

TABLE 2

Filter Size Comparisons

| Unit-Size Per Function | | 31 Tap FIR | | 5 Pole QRC | |
|---|---|---|---|---|---|
| Gates | Function | Filter | Gates | Filter | Gates |
| 1440 | Multipliers | 16 | 23040 | | 0 |
| 120 | Adders | 31 | 3720 | 30 | 3600 |
| 32 | Registers | 16 | 512 | 21 | 672 |
| 24 | MUX (2:1) | | | 10 | 240 |
| | Total Gates | | 27272 | | 4512 |
| | Size Percent | | 100% | | 17% |
| 50000 | Filters Per ASIC | | 1.8 | | 11.1 |

Preferably, although not necessarily, all poles are controlled by the same K bandwidth control value. For a given desired bandwidth "B", the following equation can be used for setting this control parameter K:

$$K = {}_\pi B (2^{(1/N)} - 1)^{(-1/2)} R^{-1}.$$

When B is much less than R/2 (Nyquist limit) and when R/20<B<R/2, where: B is the bandwidth (herein, 3 dB); R is the sampling/replication clock rate and N is the number of poles. When K=1, the gain is perfectly flat across the entire Nyquist limited range.

The QRC filter shown in FIG. 6 is more efficient than the FIR filter because it only uses ten multiplies for its five poles in quadrature instead of the FIR's sixteen multiplies for its thirty-one symmetric taps. Typically, the majority of digital processing circuitry is used to perform multiplies rather than perform other functions such as registering or adding.

Figure 7C:
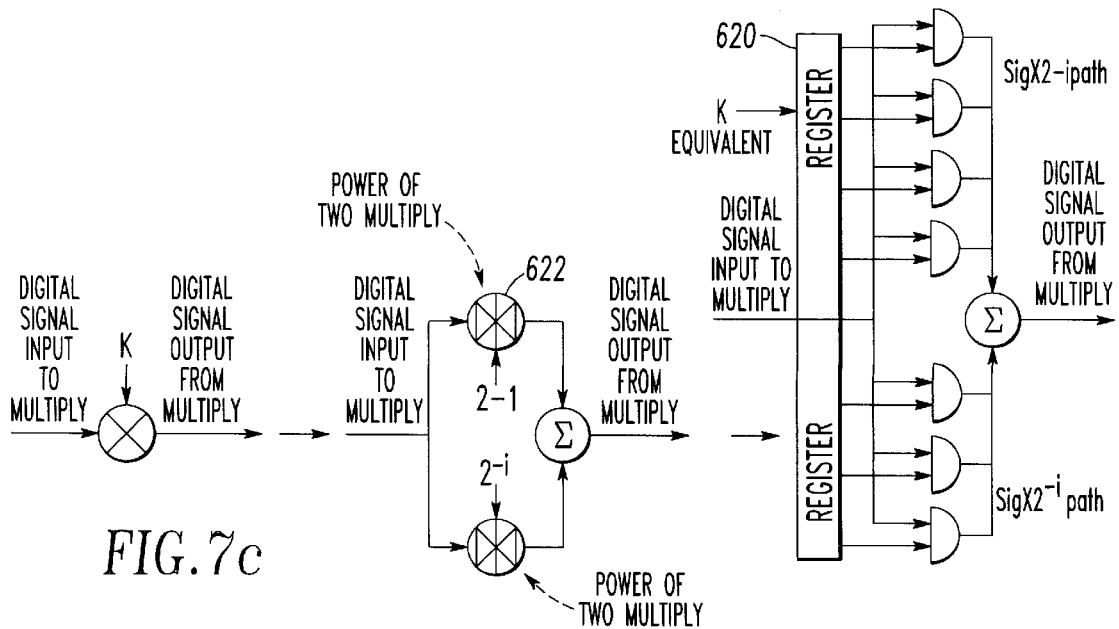
FIG. 7c illustrates an approach to eliminate the multiplies from the QRC filter.

FIG. 7c illustrates a way that all the multiplies can be eliminated from the QRC filter. The approach shown in FIG. 7c exploits the fact that multiplying by a power of two is equivalent to a shift right or shift left which can be accomplished with a few gates as shown. Although limiting K to values that are powers of two limits the bandwidth resolution, a 4 bit control will allow the bandwidth to vary from 100% of the Nyquist limit to 1% of the Nyquist limit with no step causing more than a 25% change unless the bandwidth approaches the Nyquist limit. For some application, such as electronic warfare, this bandwidth control coarseness is adequate. The 4 bit control is based on the multiply function accomplished with 2 parallel shift paths, the i and j paths as shown in FIG. 7c.

The present invention will function to provide flexible frequency-selective modulation that is programmable with programmable spectral assignments for each modulation pattern. The set filters described herein can also be used in receivers, such as used in electronic warfare.

The present invention provides the advantages of maximizing the cost effectiveness of digital filter equipment, minimizing the throughput delay and eliminating analog tolerance and inflexibility problems while eliminating digital processing interim at overflow difficulties. The present invention further eliminates clock rate problems, eliminates the multiplies from the filter processing, minimizes the number of filter taps/stages, applies modulation indirectly to minimize throughput delay, uses imaginary number processing to efficiently apply phase modulation, uses continually changing phase addition (or subtraction) to create a frequency offset modulation, and eliminates the scaler to complex transform approximations inherent in conventional transform approaches.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital channelization processor, having a channel configuration comprising:
   a filter and first transform circuit that convert a real input signal having a first clock rate to a quadrature signal having a second clock rate slower than the first clock rate and including a magnitude signal and a phase signal;
   an offset modulator that applies a programmable distinctive modulation on the quadrature signal to create a offset signal;
   a second transform circuit that converts the offset signal to a real output signal having the first clock rate; and
   a memory circuit that temporarily holds the real output signal to generate a real range delay signal.

2. The digital channelization processor of claim 1, wherein the offset modulator includes
   a multiplier that multiplies the magnitude signal by a gain value to produce an amplitude modulated signal, and
   an adder that alters the phase signal by a delta phase to provide an altered phase signal.

3. The digital channelization processor of claim 2, further comprising a phase generator that provides the delta phase.

4. The digital channelization processor of claim 1, wherein the memory circuit is one of a random access memory or shift register memory.

5. The digital channelization processor of claim 1, wherein the first transform circuit is a first oscillator that indirectly modulates the input signal via a first multiplier, and the second transform circuit is a second oscillator that demodulates the offset signal via a second multiplier.

6. The digital channelization processor of claim 5, wherein an input signal of the second multiplier has the second clock rate and the second oscillator and an output signal of the second multiplier have the first clock rate.

7. The digital channelization processor of claim 1, wherein the filter is a low pass digital feedback filter having a plurality of poles for setting a bandwidth and a shape factor of the real input signal.

8. The digital channelization processor of claim 1, wherein the filter has a bandwidth and the memory circuit has a clock rate that is less than twice the bandwidth of the filter.

9. The digital channelization processor of claim 1, further comprising gates that register the quadrature signal from a predetermined percentage of equally spaced clock pulses of the filter to perform data decimation.

10. The digital channelization processor of claim 1, wherein the filter is a finite impulse response digital filter.

11. The digital channelization processor of claim 1, wherein the first transform circuit accesses a look-up table to convert the real input signal to the quadrature signal.

12. A digital channelization processor having a plurality of channels, each channel comprising:
   a filter and first transform circuit that converts a real input signal having a first clock rate to a quadrature signal having a second clock rate slower than the first clock rate and including a magnitude signal and a phase signal;
   an offset modulator that applies a programmable distinctive modulation on the quadrature signal to create a offset signal;
   a second transform circuit that converts the offset signal to a real output signal; and
   a memory circuit that temporarily holds the real output signal to generate a real range delay signal.

13. The digital channelization processor of claim 12, wherein the offset modulator includes
   a multiplier that multiplies the magnitude signal by a gain value to produce an amplitude modulated signal, and
   an adder that alters the phase signal by a delta phase to provide an altered phase signal.

14. The digital channelization processor of claim 12, wherein the first transform circuit is a first oscillator that indirectly modulates the input signal via a first multiplier, and the second transform circuit is a second oscillator that demodulates the offset signal via a second multiplier.

15. The digital channelization processor of claim 14, wherein an input signal of the second multiplier has the second clock rate and the second oscillator and an output signal of the second multiplier have the first clock rate.

16. The digital channelization processor of claim 12, wherein the filter is a low pass digital feedback filter having a plurality of poles for setting a bandwidth and a shape factor of the real input signal.

17. The digital channelization processor of claim 12, further comprising gates that register the quadrature signal from a predetermined percentage of equally spaced clock pulses of the filter to perform data decimation.

18. A method for applying digital channelization, comprising the steps of:
   (a) converting a real input signal having a first clock rate to a quadrature signal having a second clock rate slower than the first clock rate and including a magnitude signal and a phase signal;
   (b) applying a programmable distinctive modulation on the quadrature signal to create a offset signal;
   (c) converting the offset signal to a real output signal; and
   (d) temporarily holding the real output signal to generate a real range delay signal.

19. The method of claim 18, wherein step (b) further comprises
   multiplying the magnitude signal by a gain value to produce an amplitude modulated signal, and
   altering the phase signal by a delta phase to provide an altered phase signal.

20. The method of claim 18, further comprising registering the quadrature signal from a predetermined percentage of equally spaced clock pulses of the filter to perform data decimation.

* * * * *